April 19, 1932.   B. D. BOENKER ET AL   1,855,088
AIR GAUGE
Filed Nov. 24, 1928

WITNESS
C. H. Mann

INVENTORS
Benton D. Boenker
and W. S. Hutchinson
BY
ATTORNEY

Patented Apr. 19, 1932

1,855,088

UNITED STATES PATENT OFFICE

BENTON D. BOENKER AND WILLIAM S. HUTCHINSON, OF ST. LOUIS, MISSOURI, ASSIGNORS OF ONE-THIRD TO RAYMOND B. NAES, OF ST. LOUIS, MISSOURI

AIR GAUGE

Application filed November 24, 1928. Serial No. 321,669.

Our invention relates to pressure gauges for pneumatic tires.

An object of the same is to provide a pressure gauge whereby the pressure in a pneumatic tire may be read at all times and will permit the passage of air into the tire from a suitable source of pressure or the release of the tire pressure from the latter when desired.

The invention further provides an air gauge which is permanently associated with the usual pneumatic tire stem and is of such construction as to reduce its liability to breakage to a minimum.

Another object of the invention is to provide a pressure gauge of this character which will normally hold the usual check valve in the tire stem in open position to permit tire pressure to be communicated to a pressure indicator mechanism, but when removed from the tire stem will permit the check valve to seat in the usual manner thus preventing the loss of tire pressure.

With the preceding and other objects and advantages in mind, the invention consists in the novel combination of elements, constructions and arrangements of parts and operations to be hereinafter specifically referred to, claimed and illustrated in the accompanying drawings, wherein:

Figure 1:
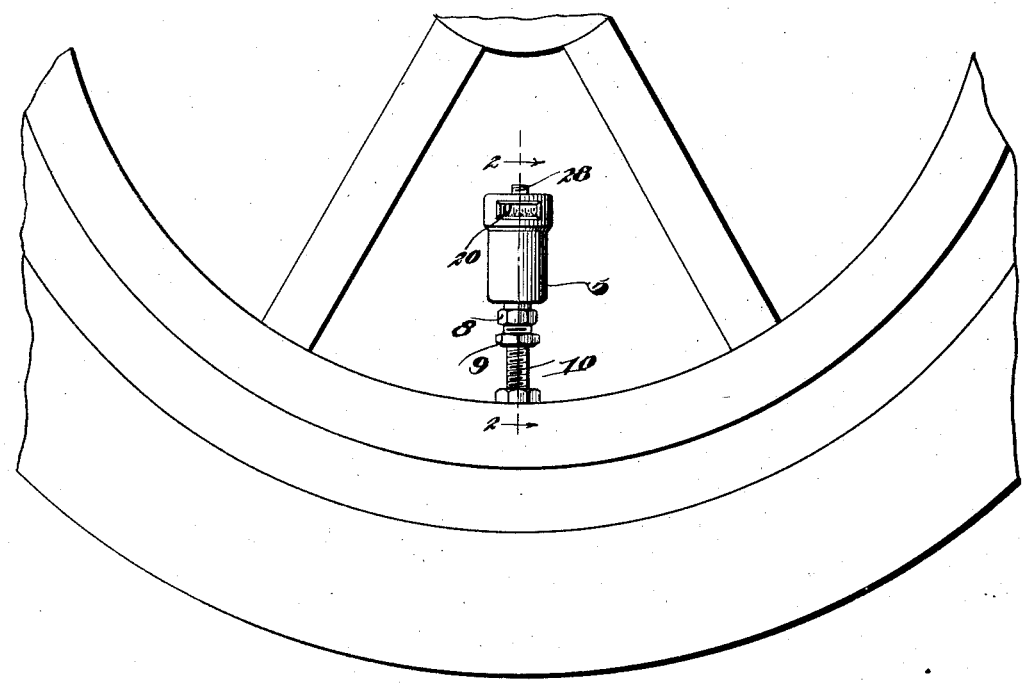
Figure 1 is a fragmentary side elevation of a pneumatic tire having our invention associated therewith.
Figure 2:
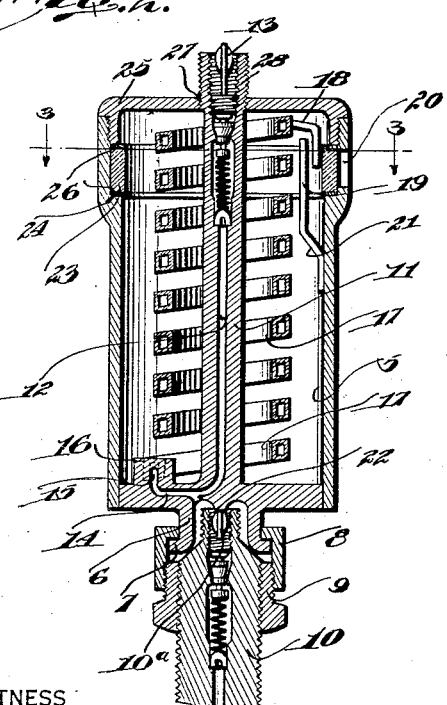
Figure 2 is a longitudinal sectional view of the same taken on line 2—2 of Figure 1.
Figure 3:
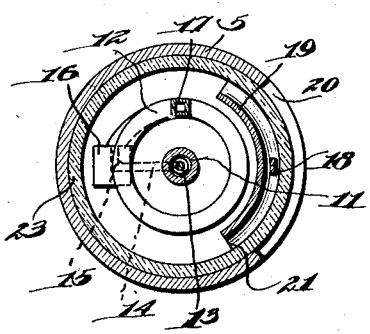
Figure 3 is a transverse section taken on line 3—3 of Figure 2.

Referring to the invention in detail, a cylinder 5 whose bottom is formed with a hollow central nipple 6 terminating in an annular flange 7 is provided. A flanged nut 8 is loosely received on the nipple and held against displacement therefrom by the annular flange 7. Cooperating with the nut 8 in holding the casing in operative position is a bushing 9 having screw threaded engagement with a conventional tire stem 10 at the upper end thereof which has threaded engagement with the nut 8.

Formed with the bottom of the casing and extending longitudinally and centrally thereof is a post 11 having a longitudinal bore 12 extending its entire length. At its upper end, this bore 12 is enlarged and receives a conventional check valve 13 which is normally closed to the atmosphere. At its lower end, this bore 12 communicates with a by-pass 14 provided in the bottom of the cylinder and leading from the hollow nipple. The by-pass 14 communicates with a conduit 15 formed in an upstanding enlargement 16 cast with the inner face of the bottom of the cylinder.

For the purpose of indicating the pressure contents of a tire tube, from which the stem 10 projects, a pressure responsive element in the form of a helically coiled resilient tube 17 is provided. The coiled tube 17 encircles the post 11 and has its lower extremity welded or otherwise secured to the enlargement 16 and communicating with the conduit 15. The opposite end of the coiled tube is closed so that when pneumatic pressure flows into the tube, the latter will be expanded according to the air pressure contained in the tire tube. Fixed to the upper end-most convolutions of the tube is a laterally extending L-shaped indicating finger 18 which is movable over a semi-circular graduated scale 19 disposed to one side of a semi-circular slot or sight opening 20 provided in the upper end of the cylinder.

The scale 19 is formed with an offset attaching portion 21 which is secured to the walls of the cylinder below the opening 19 so as to support the scale in spaced relation to the cylinder walls so that the vertical leg of the indicating element may move between the scale and cylinder walls.

In order to permit pneumatic pressure to flow from the valve stem 10 and into the coiled tube, a boss 22 is formed upon the under face of the cylinder bottom and is located centrally of the hollow nipple to engage the usual check valve 10a in the tire stem to hold the latter in open position.

In order to preclude the passage of dirt and other foreign matter into the cylinder by way of the slot 20, a relatively heavy glass annulus 23 is received in the upper end of the cylinder in transverse alinement with the slot 20. The glass annulus 23 is clamped between an annular internal shoulder 24 provided upon the interior of the cylinder and a closure cap 25 having threaded engagement with the cylinder. Packing elements 26 are arranged upon the opposite faces of the annulus to protect the same against breakage. A central threaded opening 27 is provided in the closure and has threaded engagement with the threaded projecting end 28 of the post to lend rigidity to the latter at this point.

With a tire gauge thus constructed, the pneumatic pressure will be always communicated to the pressure responsive element and thus indicate the tire pressure at all times.

When it is desired to increase the tire pressure, the usual air hose chuck is positioned on the projecting end 28 of the post and in so doing, the valve 13 is depressed to allow air pressure to pass through the bore 12 and into the tire stem. In the event that it is desired to release some of the pressure from the tire, the valve 13 will be held depressed in the usual manner.

What is claimed is:

1. In an air pressure indicator for pneumatic tires, an elongated tubular casing adapted to be positioned on the tire stem and having means for holding the valve thereof in open postion, the casing having a by pass at one end which is adapted to open into the tire stem, a helically coiled pressure responsive tube in the casing and extending substantially the entire length thereof and having one end closed and its other end open and communicating with the by pass, a pressure indicating finger fixed to the pressure responsive tube adjacent its closed end, and a graduated scale opposed to the finger and over which the latter moves.

2. In an air pressure indicator for pneumatic tires, an elongated tubular casing adapted to be positioned on the tire stem and having means for holding the valve thereof in open position, the casing having a by-pass at one end which is adapted to open into the tire stem, a helically coiled pressure responsive tube in the casing and extending substantially the entire length thereof and having one end closed and its other end open and in communication with said by-pass, an arcuate shaped graduated scale carried within the casing and spaced from the side wall thereof, said casing having a sight opening for viewing said scale, and a pressure indicating finger carried by the pressure responsive tube adjacent the closed end thereof, said finger having a portion thereof disposed between said graduated scale and said sight opening whereby to visibly indicate on said scale the air pressure in the tire.

BENTON D. BOENKER.
WILLIAM S. HUTCHINSON.